United States Patent [19]
Pahmeier et al.

[11] Patent Number: 5,359,542
[45] Date of Patent: Oct. 25, 1994

[54] VARIABLE PARAMETER COLLISION AVOIDANCE SYSTEM FOR AIRCRAFT WORK PLATFORMS

[75] Inventors: Max C. Pahmeier, Renton; Richard T. Pierce, Monroe, both of Wash.

[73] Assignee: The Boeing Company, Seattle, Wash.

[21] Appl. No.: 811,523

[22] Filed: Dec. 20, 1991

[51] Int. Cl.5 .................. G01B 11/24; G06F 15/50
[52] U.S. Cl. .................. 364/461; 364/424.07; 364/559; 356/376
[58] Field of Search .......... 364/559, 550, 460, 461, 364/424.02, 424.01, 424.07; 356/376, 387, 379, 380; 340/436

[56] References Cited

U.S. PATENT DOCUMENTS

| | | | |
|---|---|---|---|
| 3,835,498 | 9/1974 | Arato | 15/21 E |
| 4,207,642 | 6/1980 | Arato | 15/53 AB |
| 4,357,900 | 11/1982 | Buschor | 118/681 |
| 4,378,755 | 4/1983 | Magnusson et al. | 118/684 |
| 4,605,569 | 8/1986 | Shimada et al. | 427/256 |
| 4,714,044 | 12/1987 | Kikuchi et al. | 118/314 |
| 4,721,630 | 1/1988 | Takeo et al. | 427/421 |
| 4,819,167 | 4/1989 | Cheng et al. | 364/559 |
| 4,841,460 | 6/1989 | Dewar et al. | 364/559 |
| 4,869,935 | 9/1989 | Hayashi et al. | 427/421 |
| 4,888,707 | 12/1989 | Shimada | 364/461 |
| 4,905,913 | 3/1990 | Frikker | 239/751 |
| 4,989,981 | 2/1991 | Kawamura et al. | 356/376 |
| 5,138,904 | 8/1992 | Lande et al. | 74/661 |
| 5,160,977 | 11/1992 | Utsumi | 356/376 |
| 5,161,557 | 11/1992 | Scheiter, Jr. | 134/57 R |
| 5,170,352 | 12/1992 | McTamaney et al. | 364/461 |

*Primary Examiner*—Thomas G. Black
*Assistant Examiner*—Michael Zanelli
*Attorney, Agent, or Firm*—Dellett and Walters

[57] ABSTRACT

A system for determining the position of an airplane in a hangar and for limiting the motion of a plurality of gantry cranes around the airplane, the system including a plurality of movable scanners which ascertain locations of a plurality of collinear points along the leading edges of the wings of the airplane, including a processor system for determining a point of intersection of lines through the collinear points, the point of intersection and lines having a known positional relationship with the other portions of the airplane from which the processor system also determines the locations of other portions of the airplane, the processor system determining limits on the cranes' motion relative to the airplane.

20 Claims, 9 Drawing Sheets

VARIABLE PARAMETER COLLISION AVOIDANCE SYSTEM FOR AIRCRAFT WORK PLATFORMS

BACKGROUND OF THE INVENTION

This invention relates generally to control systems and more particularly to position detection and collision avoidance systems.

In the aircraft industry, it is necessary to provide access of persons to the outer surfaces of large aircraft to paint and maintain the aircraft. To provide such access to the outer surfaces of large aircraft, a plurality of large gantry cranes, known as stackers or stacker cranes hanging from rails mounted within and near the ceiling of an aircraft hangar, have been employed. Each of these gantry cranes has been operated by an operator riding on a platform on the lower end of a vertically extendible and retractable crane mast.

Employing a plurality of such cranes has presented particular problems with respect to collisions between the cranes themselves, between the cranes and other objects in the hangar and most importantly between the cranes and the aircraft. The problem of collisions between the cranes and the aircraft has been exacerbated by the fact that, in order for the painters/crane operators to effectively prepare and paint the aircraft, the crane platforms need to be positioned within an approximate range of four inches to ten feet from the aircraft, depending on the task.

A single collision between a crane and one of today's modern aircraft can be very costly, not to mention the danger of human injury. Thus, it is extremely important that the gantry cranes not hit the aircraft.

Because of the magnitude of the task of painting a large commercial aircraft, because of the potential for economic loss associated with collisions, and because of the inadequacy of previous crane control systems, the painting state has become a "bottle neck" in aircraft manufacturing.

One reason for the difficulty experienced in developing control systems for avoiding collisions between cranes and aircraft has been due to the fact that each aircraft is not parked in the exact same location and with the exact same positioning and orientation relative to the cranes and the hangar. In other words, it has been difficult to determine the position of the surfaces of the aircraft relative to the hangar and the cranes, and this in turn has made difficult the development of adequate control systems.

Control systems for cranes operable around large aircraft have evolved from the earliest stages where crane operators themselves were alone responsible for manually and visually keeping the crane and the movable platform on the crane away from the aircraft and other objects in the hangar by appropriately operating the crane's controls to avoid collisions. Of course, with such a system, human error and accidental depressions of crane controls have resulted in both minor and major collisions.

A first attempt at solving some of the problems has been termed a collision detection system. With such a system, a number of strategically placed wands, contact tapes and bumpers have been placed around the perimeter of the crane's platform and on the crane structure itself at locations where the platform or the crane could collide with the aircraft or other objects in the hangar. Upon touching or bumping the aircraft or other objects, these systems have, through a system of relays, interrupted control power to the cranes to avoid further and more damaging movement.

Though such collision detection systems often have avoided major collisions, they have had several disadvantages, including the fact that activation of the collision detection wand, contact tape or bumper has cut control power to all stacker crane functions and has required service calls to restart the stackers. This has required as many as 20-30 service calls per week to enable further crane operation. Also, these prior detection systems have damaged wet paint on the aircraft or the aircraft as they have had to touch the aircraft before interrupting power to the crane. Moreover, these prior control and collision detection systems have not been found infallible. There have continued to be both minor and major collisions in the paint hangar.

A second generation of control systems termed anti-collision systems have been developed in an attempt to solve the problems associated with the aforementioned first generation collision detection systems. These anti-collision systems have employed commercially available non-contact sensors, such as ultrasonic and diffused reflective infrared sensors wherein either an ultrasonic or reflective infrared wave has been propagated toward the object or aircraft to be avoided. Upon detection of a reflected ultrasonic or light wave from an object, the non-contact sensors have interrupted motion of the crane. With such systems, the operator has usually been able to manually operate the crane away from the danger, i.e., by pulling the crane upwardly, and if necessary, the operator has been able to manually override the anti-collision system to move the crane away from danger.

While the second generation control system virtually eliminated the need for service calls to repower the cranes after detection of an impending collision, such systems still have had several disadvantages. For example, compound curved surfaces on the aircraft have scattered ultrasonic signals so as not to provide sufficient feedback. Also, differing surface reflectiveness of objects have caused the stacker cranes to stop at varying distances, between 6 and 18 inches from the aircraft, depending on the brightness of the surface. Moreover, certain objects within the hangar have not provided an upper surface effective to stop motion of the crane before a collision has occurred. Still further, in the painting environment, the use of the diffused reflective infrared sensors has become limited, since overspray can cover the light emitting portion of the sensors causing the sensors to become less effective.

SUMMARY OF THE INVENTION

In accordance with one aspect of the present invention, a method and apparatus for determining the position of an aircraft relative to a known reference is provided which comprises means for ascertaining a portion of the aircraft, and computing means for determining the position of the aircraft according to data sent from the means for ascertaining the portion of the aircraft and from a known relationship between the data and another portion of the aircraft.

Preferably, the means for ascertaining the portion of the aircraft comprises a plurality of movable scanners. Such scanners suitably ascertain the leading edges of the wings and send scanner positional data to computing means preferably comprising a hangar processor.

From this positional data, the computing means then suitably determines the location relative to the known reference of a point of intersection of lines through collinear points positioned along the leading edges of the wings. The point of intersection has a known relationship with other points of the aircraft and that relationship is also used in determining the location of the aircraft.

The means described above determines the X and Y position of the aircraft, while a hand operated sight gauge or other scanning means may be employed to determine the distance of the aircraft from the ground, which distance may vary due to differing loads, shock absorber compressions and tire pressures. This additional positional data relating to the height of the aircraft is used further to determine the position of the aircraft within the hangar. The first aspect of the invention enables determination of the location and positioning of newly parked and differently positioned aircraft and outer surfaces thereof relative to a hangar reference point within a hangar coordinate system.

Computer means sets software limits on the motion of movable apparatus around the aircraft using aircraft positional data as previously determined to avoid collision between the movable apparatus and the aircraft. The movable apparatus usually comprises a gantry crane movable in X, Y and Z directions and having a platform that is rotatable about a vertically extendible and retractable mast of the crane. Still further, a plurality of such gantry cranes are controllable within such software limits.

Computing means for determining the aircraft's position suitably comprises a hangar processor, and computing means for determining the software limits on the motion of the cranes suitably comprise a plurality of programmable logic controllers (PLCs), one PLC aboard each gantry crane, which control the motion of the cranes according to software limits.

Not only are software stop limits on the motion of the cranes imposed, but slow down limits may also be imposed within certain regions. Such regions of slowed motion include, for example, a spatial envelope around the stop limits on the cranes' motion. Such an envelope provides the crane operators with confidence that their cranes will stop and in a non-abrupt fashion as they approach the limits on the cranes' motion.

A plurality of encoders and hardware connections transmit the cranes' positions along the hangar's X, Y and Z coordinate axes and also send the rotational position of the platforms on the cranes to the on-board PLCs which compare the positions of the cranes to the software limits in determining whether to signal further motion of a crane in a given direction.

The cranes may be limited in motion so as to access only certain portions of the aircraft such that the amount of data residing within the PLCs and necessary to determine the limits of motion on the cranes is minimized. Further, the particular limits determined by a particular PLC are determined according to the particular crane's location within its limited range of motion. This arrangement enhances the efficiency of the system and enables operation of the system on a relatively small amount of computing power and memory.

Another aspect of the invention provides the ability to map other objects within the hangar, e.g., trash bins, vehicles, air conditioning ducts, cat walks, water cannons and safety railings, into the software limits on the motion of the cranes.

Software limits on the motion of the cranes may be combined with other collision detection and/or anti-collision mechanisms, such as limit switches, wands, tape contacts, bumpers, ultrasonic sensors and diffused reflective infrared sensors which serve as logical inputs to ladder logic control software run by the PLCs. Thus, for example, ultrasonic sensors for avoiding crane to crane collisions, including sensors placed on the trolley rails of the cranes which look for the trolley rails of adjacent cranes, have been successfully implemented and used together with the software collision avoidance system summarized above. As another example, diffused reflective infrared sensors are used on the underside of the platform for determining when a crane may be lowering onto an object below the platform. Upon detecting the presence of an object, these sensors send a signal to the PLCs which appropriately open or close a corresponding logical software expression to achieve the desired result.

Also, other collision avoidance devices may be used with the above described collision avoidance system, such as warning lights and/or warning bells or signals, for notifying the operators of the cranes when the cranes are no longer operating under the software limits of the collision avoidance system. This provides the painters/operators of the cranes with further assurance and confidence in operating the cranes around the aircraft.

The method and apparatus disclosed for determining the position of the aircraft relative to a reference and for using that positional data in setting software limits on the motion of gantry cranes around the aircraft overcome many of the problems associated with prior art control systems. With software limits on the motion of the cranes, the use of wands, contact strips, bumpers, ultrasonic and/or diffused reflective infrared sensors may be altogether eliminated or at least limited in use to those situations where they are most effectively employed to send detection or anti-collision signals to the software logic program. Thus, higher quality paint jobs are obtained inasmuch as wet paint need not be damaged by contact with a wand, contact tape or bumper. And, the prior art problems resulting from differing reflective properties of different surfaces, the scattering of ultrasonic waves on compound curved surfaces and paint overspray limitations on the effectiveness of the diffused reflective infrared sensors have been alleviated.

Moreover, the invention eliminates the need for an interrupt of control power to the cranes by a collision detection device, and, therefore, fewer service calls by maintenance persons are needed. Indeed the incidence of collisions between the cranes and their platforms and the aircraft and other objects in the hangars has been virtually eliminated. With the present invention, a painter can move his or her crane very close to the aircraft, and he or she can do so without having to override any sensing device which would otherwise keep the crane platform too far away.

Accordingly, it is an object of the invention to provide an improved apparatus and method for determining the position of an aircraft relative to a known reference. Another object of the invention is to provide an improved system of collision avoidance which is directed to solving the problems associated with prior art systems.

The subject matter of the present invention is particularly pointed out and distinctly claimed in the concluding portion of this specification. However, both the organization and method of operation of the invention, together with further advantages and objects thereof, may best be understood by reference to the following description taken in connection with the accompanying drawings wherein like reference characters refer to like elements.

DETAILED DESCRIPTION

Figure 1:
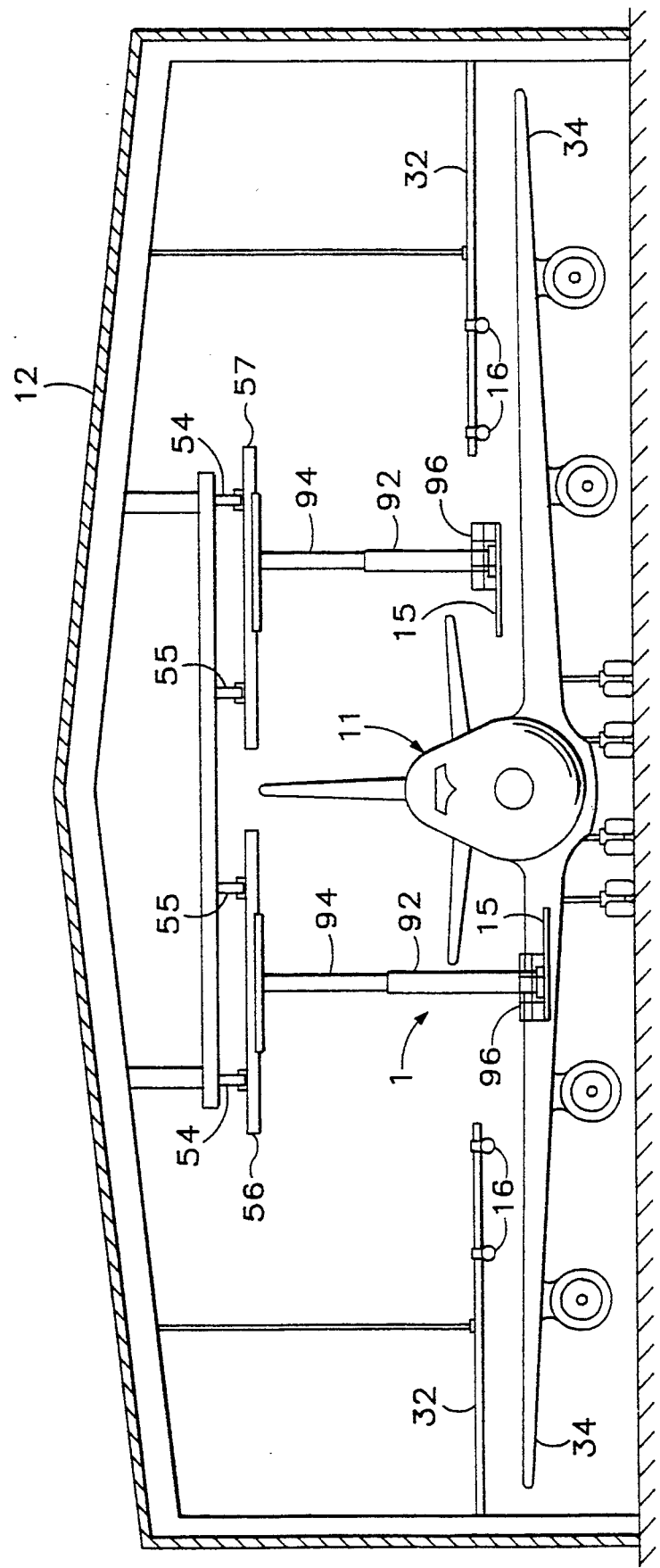
FIG. 1 is an end view of a large commercial airplane in a paint hangar together with a plurality of paint and maintenance stacker cranes which hang from rails mounted within the hangar and above the airplane.
Figure 2:
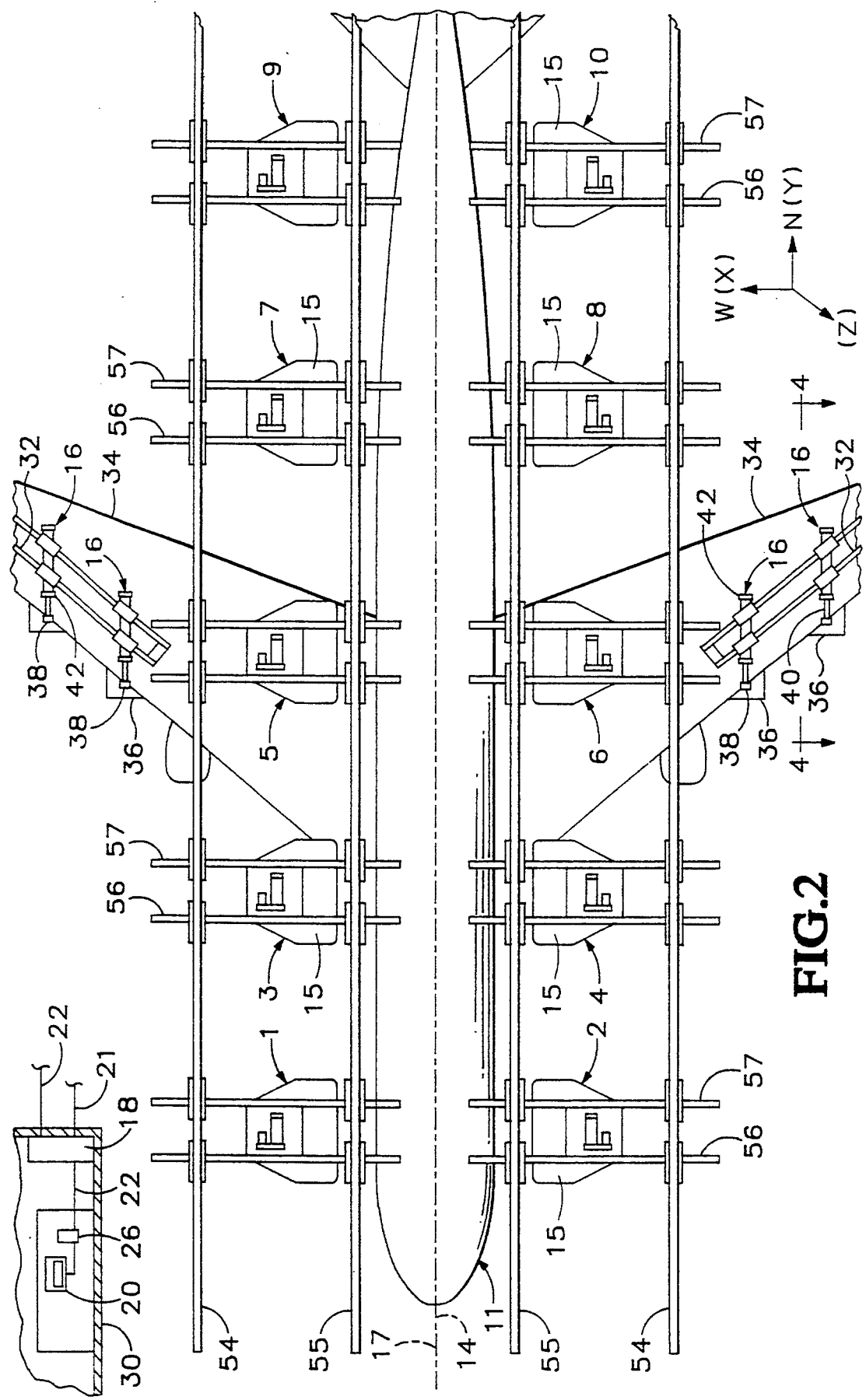
FIG. 2 is a schematic plan view of a hangar with an airplane and stacker cranes therein and includes a schematic representation of airplane position determining means.

Referring to FIGS. 1 and 2, the positioning and collision avoidance system of the present invention is typically utilized in determining the position of a large aircraft 11 within a building or hangar 12, such as a painting and maintenance hangar, for determining and setting software limits on the motion of a plurality of gantry cranes 1-10 otherwise known as stacker cranes including their platforms 15, and for controlling the cranes for collision avoidance.

Since it is not common for large aircraft to be parked in exactly the same position within the hangar 12 every time, and since different aircraft will have different heights between the aircraft and the ground, due to varying loads aboard the aircraft, varying shock-absorbing compressions and varying tire pressures, it is necessary to determine an offset position of the aircraft relative to an absolute origin of an X, Y, Z coordinate system within the space of the hangar with respect to which the cranes 1-10 move.

The terminology used for describing the hangar coordinate system, according to which the offset position of the aircraft 11 is determined and relative to which the cranes 1-10 move, is set forth below. The Y axis of the hangar coordinate system runs along the building center-line 17 as shown in FIG. 2. The airplane 11 is parked with its longitudinal axis 14 running as closely along the Y axis as possible and such that the nose of the airplane is referred to as pointing south and the tail of the airplane is referred to as pointing north. The positive or incrementing direction moving along the Y axis runs from the origin of the hangar coordinate system and to the north. Thus, the Y values of planes or lines running laterally of the airplane 11 and perpendicularly to the longitudinal axis of the airplane, referred to as station lines, increase in value from the nose of the airplane to the tail of the airplane. Typically, the airplane 11 is parked with the nose of the airplane as close as possible to a positive Y axis position of 90 inches, and thus the airplanes's nose is referred to as being at station line 90 of the airplane. This feature allows easy adaptation of the system of the invention to other or future aircraft which have longer noses than aircraft for which the system is presently used, without the need for adjusting the hangar coordinate system.

The X axis of the hangar coordinate system is in a horizontal plane with the Y axis, with the X axis line running perpendicular to the Y axis. Typically, the airplane 11 is parked such that the X axis of the hangar coordinate system is close to perpendicular with the airplane's longitudinal axis 14 and as close as possible to parallel with the station lines of the airplane. Unlike a typical Cartesian coordinate system, the X axis of the hangar coordinate system increases positively on both sides of the Y axis. Thus, the X value of lines or planes perpendicular to and spaced along the X axis increase in value as each successive line is positioned farther and farther from the Y axis on either side of the Y axis. These X values are referred to as the body buttock values or distances from the longitudinal axis 14 of the airplane 11.

The origin of the hangar coordinate system is preferably on the floor of the hangar 12, and therefore the zero position of the Z axis is at the floor of the hangar and increases in a positive direction upwardly toward the ceiling of the hangar. This axis is also referred to as the water line axis and the height or Z values of the various portions of the airplane 11 are referred to as body water line values.

Figure 6:
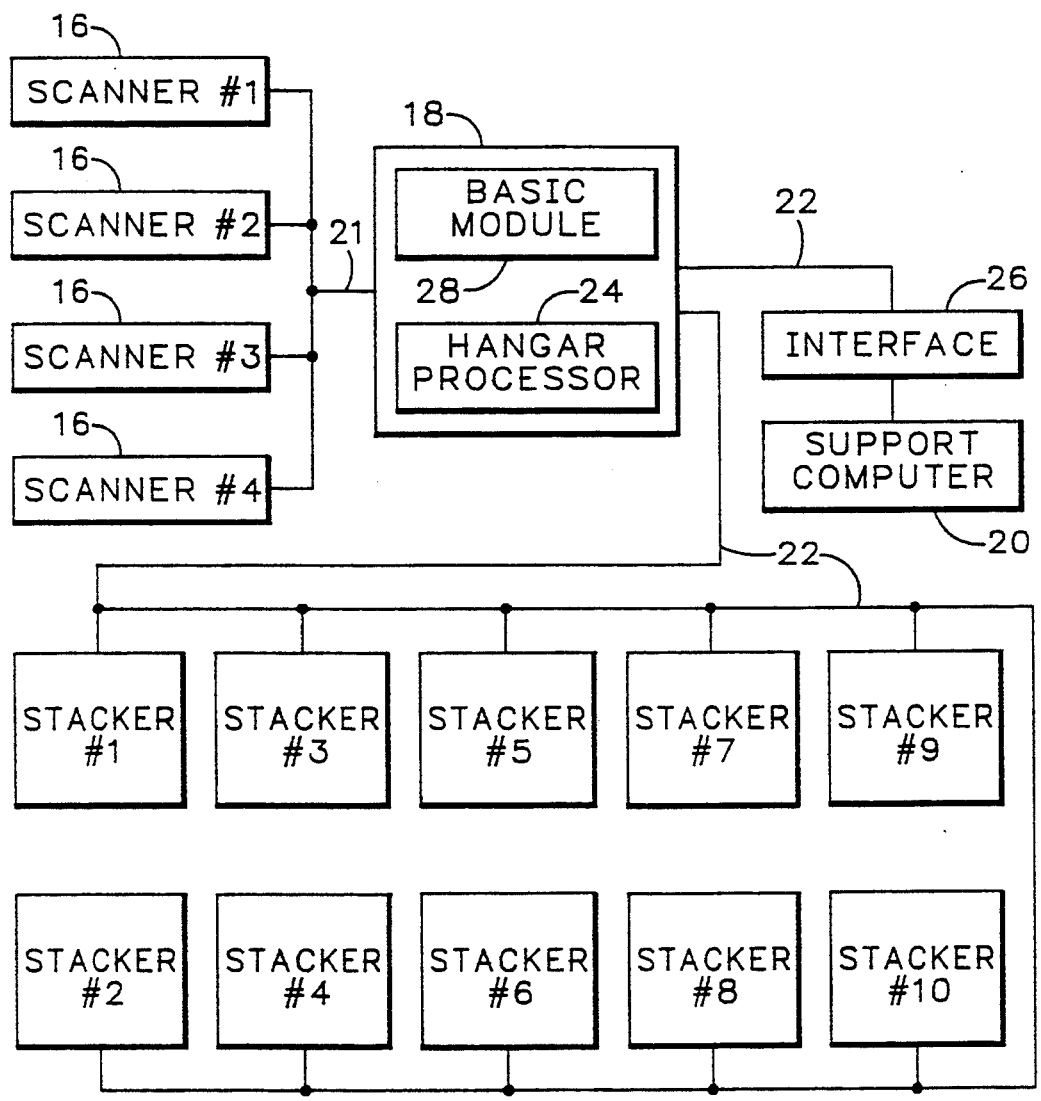
FIG. 6 is a network and interconnect diagram for the position determining and collision avoidance system.
Figure 7:
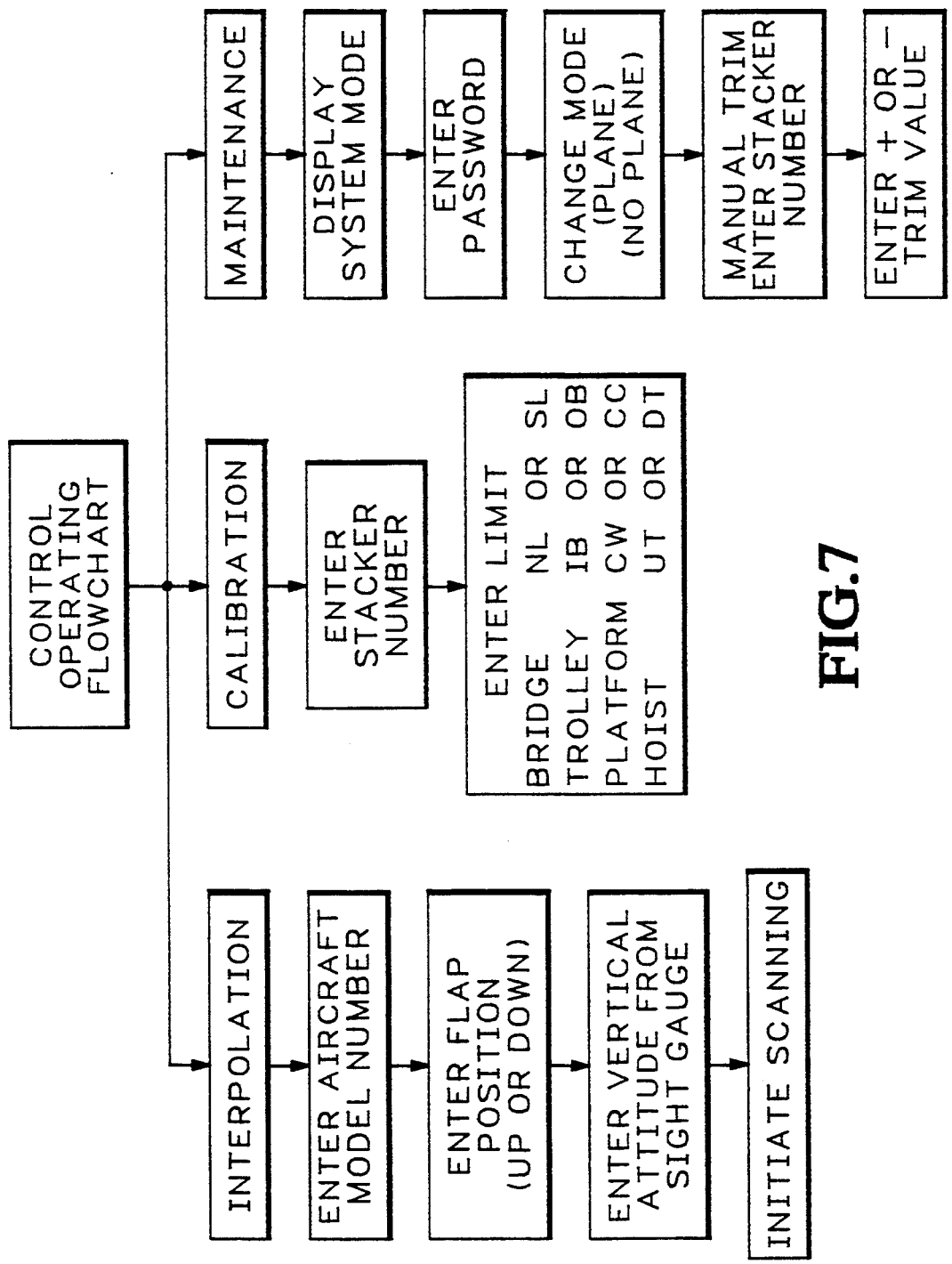
FIG. 7 is an operating flow chart for interpolation, calibration and maintenance of the position determining and collision avoidance system.

Referring now to FIGS. 6 and 7 which illustrate the network and interconnect diagram for the position determining and collision avoidance system, it can be noted that the system preferably controls a plurality of stacker cranes 1-10. Each stacker crane 1-10 has an on board programmable logic control unit (PLC) such as an Allen Bradley 5/15. (Both the cranes and their individual PLCs are referred to by the reference numbers 1-10 below.) The system comprises four scanners 16, a computer 20, such as an IBM compatible computer, an interface module 26, such as an Allen Bradley KF2 interface module, and an input/output (I/O) rack 18 which houses a hangar processor 24, an Allen Bradley 5/15 PLC, a basic module 28 and an analog/digital converter (not shown). As shown in FIG. 2, the I/O rack 18, and hence the basic module 28 and the hangar processor 24, the interface module 26 and the computer 20 are each located in a control room 30 that is adjacent the hangar 12 and which is appropriately insulated. The IBM compatible computer 20 and the Allen Bradley 5/15 PLCs were chosen relative to their memory capacity, processing speed, math capability, I/O structure and communications capabilities. However, it will be appreciated that any PLC and support computer having similar or better capabilities may be used.

The above described elements of the system are interconnected by a communications link 22, such as a Peer Link Data Highway Plus from Allen Bradley in daisy chain fashion, and the scanners 16 are hardwired at 21 to the analog/digital converter in the I/O rack as shown in FIG. 6. From computer 20, the system is routed to the interface module 26 with an RS232 serial connection and then to I/O rack 18 with a Peer Link and to the hangar processor 24. From the hangar processor 24, the routing continues from the I/O rack 18 to stacker 1 and in order through the stackers 3, 5, 7, 9, 10, 8, 6, 4 and 2. Each stacker processor (PLC) 1-10 on the link are assigned a station number in its dip switch configuration. Thus, each PLC 1-10 is individually addressable and communicates with the hangar processor 24.

This system could support up to a maximum of 64 stations wherein the stacker PLCs 1-10, the hangar processor 24 and the interface 26 are each assigned station numbers. Computer 20 serves as an operator interface to the hangar processor 24 through an RS232 serial link to the basic module 28 programmed with the Intel 52 Basic programming language. Information entered at computer 20 is processed in the basic module 28 and sent to the hangar processor 24.

The hangar processor 24 is the head of the control system. The hangar processor 24 controls the scanners 16 and receives positional data from the scanners to determine the position of the airplane 11.

Once the airplane 11 has been parked within the hangar 12, determination of the airplane's offset position relative to the absolute hangar coordinate axis is begun. Referring now to FIG. 7, this is referred to as the interpolation process and is initiated and partially performed by a system operator at computer 20. Usually, the first step of the process is to enter the aircraft type and model with its profile in three dimensions since different aircraft are differently shaped and have different engines, etc. This information is necessary to determine the position of airplane 11 and hence the software limits on the motion of the cranes 1-10. Next, the flap position of wings 34 of the airplane 11, either up or down, and a vertical height and attitude of the airplane from a sight gauge (i.e., the position of the airplane in the Z or water line direction) are entered by the system operator for more fully determining the position of the airplane within the hangar 12. It will be appreciated that, instead of a sight gauge or the like, a plurality of scanners positioned so as to determine the height of the uppermost contour line of the airplane 11 along the length of the airplane may be used to determine the vertical attitude of the airplane at various station line values along the airplane. Once the aircraft type, flap position and vertical attitude of the airplane have been entered, scanning takes place as further described below to determine the X, Y offset position of the airplane 11 relative to the origin of the hangar coordinate system.

As can also be seen in FIG. 7, the system is calibrated by entering the particular stacker number 1-10 and then entering the coordinate positions of the X, Y, Z and rotational limits of travel imposed on each stacker crane by limit switches discussed below. Calibration of the system is necessary before using the system for the first time and after a limit switch, limit switch arm or limit switch actuator is replaced. Also, as shown in FIG. 7, minor adjustments to the software collision avoidance envelopes may be made by those authorized to do so. Such maintenance includes entering the particular stacker number 1-10, entering the axis, X, Y or Z, to be adjusted, and entering the amount and sign of the adjustment.

Figure 4:
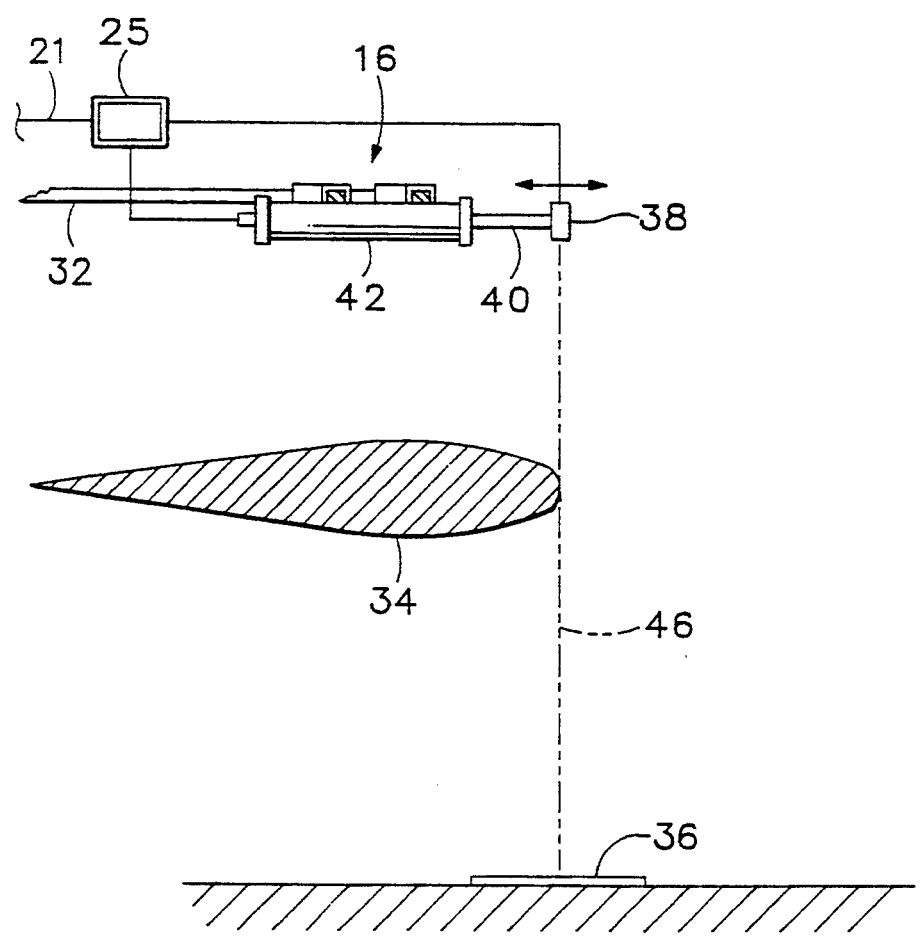
FIG. 4 is a schematic cross-sectional view of a portion of a wing of an airplane, a scanner support rail and a more detailed view of a scanner used in a position determining system.

Referring now specifically to FIGS. 2 and 4, the scanners 16 for determining the X, Y offset position of the airplane relative to the hangar coordinate system are positioned over the leading edges of the wings 34 of the airplane 11 and are suspended on rails 32 with two scanners 16 positioned above and along each wing. Each scanner 16 is mounted to the rails 32 via a pneumatic air cylinder 42 which moves an extendible rod 40 to which a scanner head 38 is attached. The X, Y positions of the scanner heads 38 within the hangar coordinate system are sent to the hangar processor 24 by an encoding or position determining means 25, such as a commercially available Balluff BTL Linear Displacement Transducer, for each scanner head. The positional feedback is sent to the hangar processor 24 via the analog/digital input module located in the hangar processor I/O rack 18. The scanner heads 38 are positioned above the wings 34 such that the scanning beams 46 pass the leading edge of the wings and reflect off a removable scanner target 36, placed below the wings, and back to the scanner heads. The scanning beam 46 from each scanner head 38 is reflected from the removable scanner target 36 while the air cylinder 42 retracts rod 40 and the scanner head, until the reflection of the scanning beam 46 is interrupted by the wing 34. This process is followed by each of the four scanners 16, and the position of each scanner head 38 at the point where the reflection is no longer reflected back to the scanner head is sent as positional data to the hangar processor 24.

Figure 3:
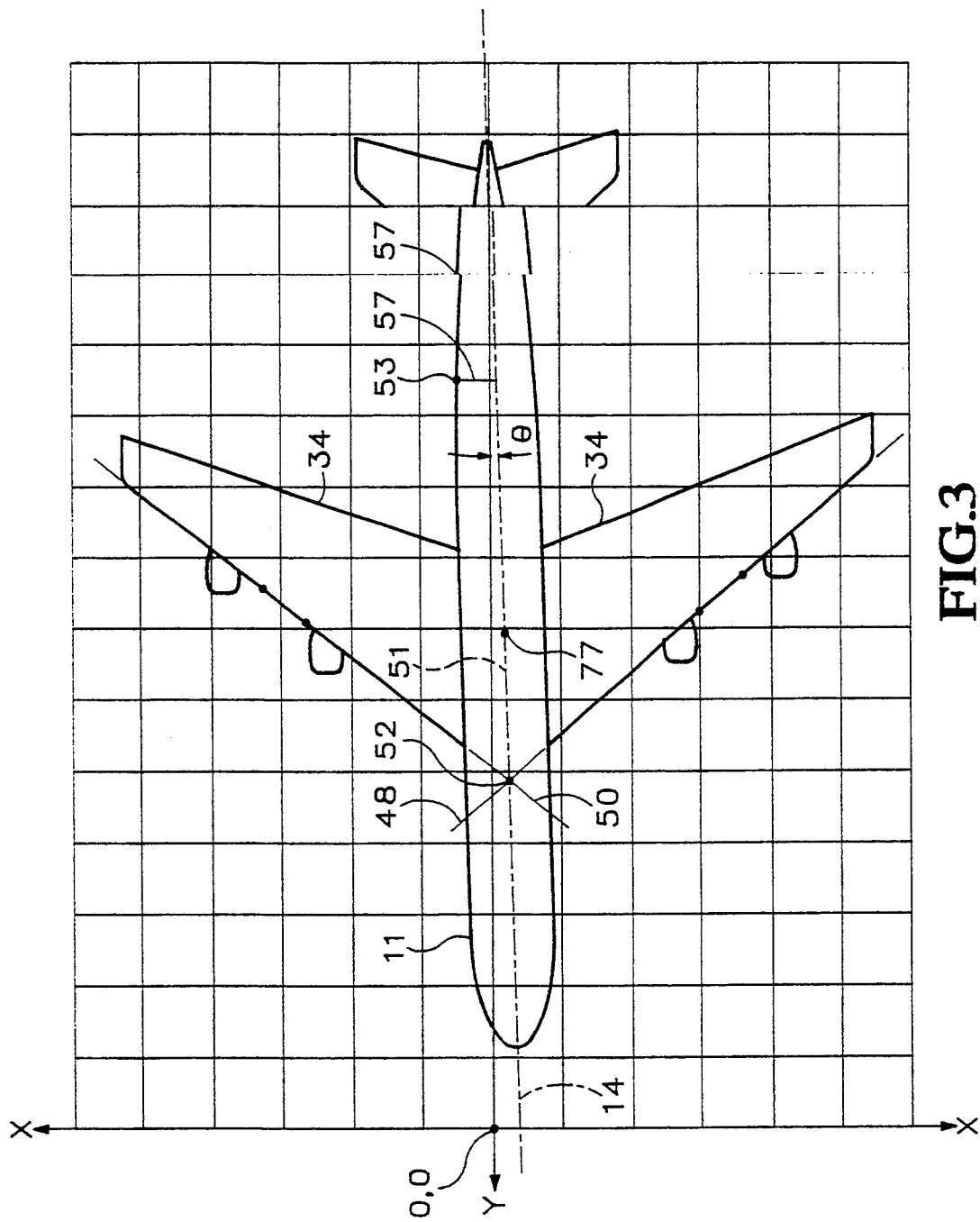
FIG. 3 is a plan view of an airplane illustrated in an offset position relative to a coordinate axis system.

The X, Y coordinate positions relative to the hangar coordinate system of the four scanner heads 38 at the points where their scanner beams 46 intersect the leading edges of the wings 34 are used to determine a pair of lines 48, 50 (FIG. 3), one line along each leading edge. Lines 48, 50 intersect at a point 52 having X, Y values that lie on the longitudinal axis 14 of the airplane 11 and that are readily ascertainable relative to the hangar coordinate system.

Commercially available computer aided design (CAD) systems, such as the CATIA system, can be used to receive information concerning and representing the surfaces, origins (or reference points) and other elements of an airplane with a series of interconnected lines, semicircles and/or spline curves having intermediate points along them, each such point having a particular X, Y, Z location relative to the rest of the points of the airplane represented by the system and relative to a chosen CATIA coordinate axis system, i.e., wherein the chosen CATIA coordinate axes are oriented similarly to the hangar coordinate system described above and wherein the airplane represented on the CATIA system is oriented in correspondence to an ideally parked airplane with the airplane's longitudinal axis running along the Y axis of the coordinate system and with the nose of the airplane at station line 90. Information such as radius values, origin-locations, taper values and point locations for a particular airplane can be obtained with reference to such data bases as a CATIA data base.

Since each airplane 11 will be parked in a slightly different position within the hangar 12, the actual X, Y, Z positions of the various coordinate points on the surface of the airplane, and especially the airplane's origin points at various station line locations, are to be determined, or at least be determinable relative to the hangar coordinate system. Determination of the actual location of the airplane 11, and especially the location of the origin points of the airplane at various station line values along the length of the airplane, can be accomplished by determining the X, Y location of one point along the longitudinal axis 14 of the airplane 11 (i.e., the X, Y location of intersection point 52) and the X, Y slope of the longitudinal axis.

The X, Y location of the longitudinal axis of the airplane is the same as that of a line 51 which passes through the point of intersection 52 and bisects the angle formed between lines 48, 50 along the leading edges of wings 34. The slope of line 51, and hence the longitudinal axis 14 of the airplane 11, may be determined from the angular relationship between the bisecting line 51 and either line 48 or 50, each of which have a known slope relative to the hangar coordinate system.

Once the slope of the longitudinal axis 14 and the X, Y position of point 52 along the longitudinal axis have been determined, bisecting line 51 may be extended the length of the airplane 11, and the X, Y values of every point along that line may be determined according to the point slope equation $Y = mX + b$. The determined X, Y values of the points along bisecting line 51 (longitudinal axis 14) are the X, Y values of the origins of the airplane 11 at various station locations along the airplane, and the Z values of these points can be determined from ideally positioned Z values adjusted by attitudinal (height) offsets determined from the sight gauge at various airplane station locations. These X, Y origin values are then further adjusted as described below in determining software limits on the motion of the cranes.

Alternative means for determining the position of the airplane 11 includes moving a corner of a particular crane 1-10 having a known X, Y and Z location to a location that is a predetermined offset distance from a portion of the airplane, i.e., a body join line having a known positional relationship with other portions of the airplane. Then according to the crane's known X, Y, Z location, the predetermined offset value and the known positional relationship between the portion and the other portions of the airplane, the position of the rest of the airplane may be determined. By ignoring or adjusting for any rotational offsets of the airplane, this method of determining the position of the airplane will yield adequate airplane location values.

Figure 5:
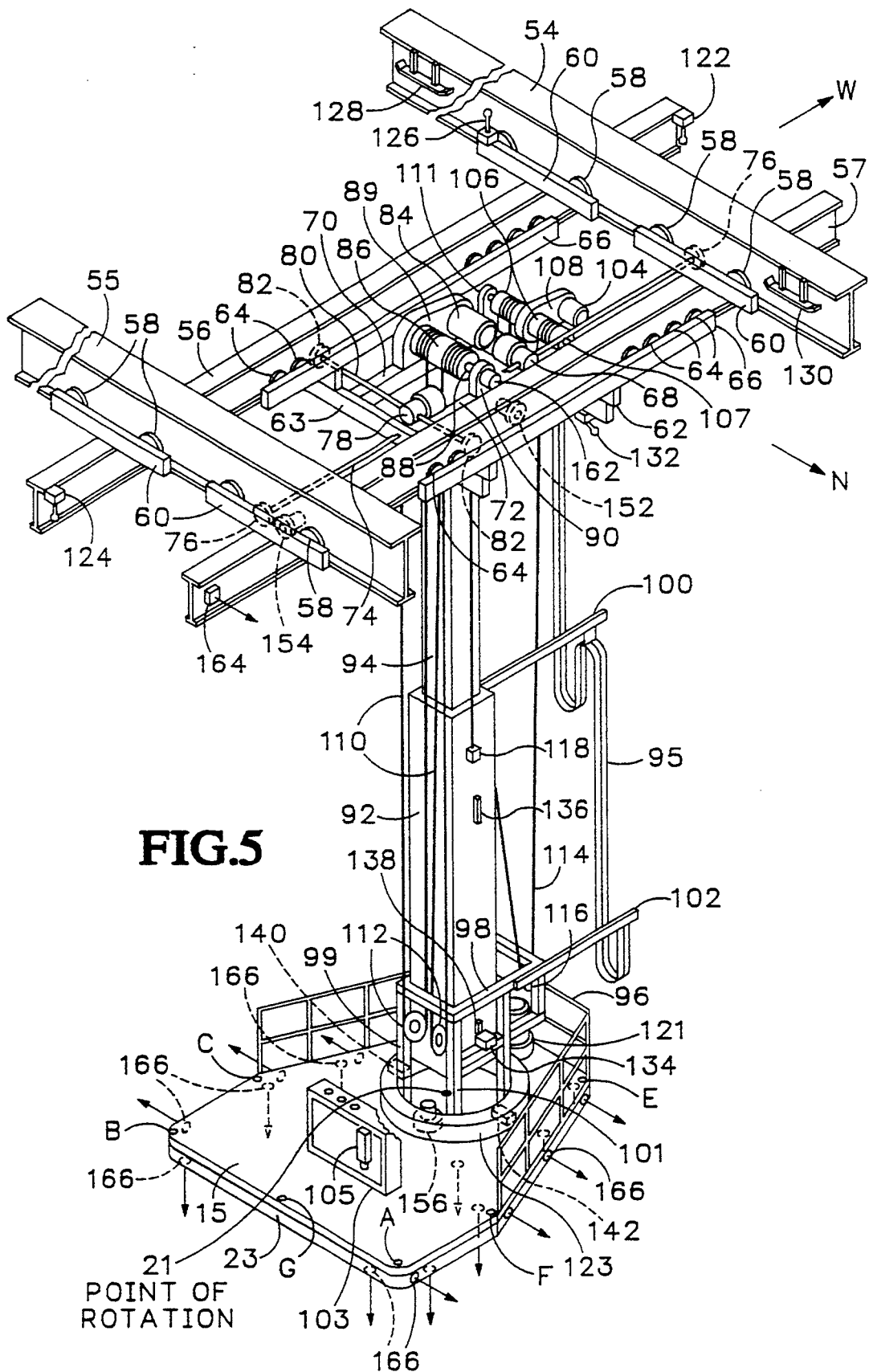
FIG. 5 is a perspective view of a stacker crane having a rotatable platform and showing the crane in greater detail together with its motors and position determining means.

Referring now to FIGS. 1, 2 and 5, each of the plurality of stacker cranes 1-10 comprises a vertical inner mast 94 along which an outer movable mast 92 travels, the outer mast forming a sleeve around the inner mast, and the inner mast guiding the travel of the outer mast along the inner mast's vertical longitudinal axis. The movable platform 15 of each crane 1-10 is movably interconnected to the movable mast 92 near the lower end thereof. The platform 15 of each crane 1-10 travels upwardly and downwardly with respect to mast 92 and is also rotatable in a horizontal plane around mast 92. Around a rear portion of the platform 15 is a safety railing 96 designed to keep objects and operators from falling off the platform. A box-shaped support structure 98 is shown attached to the lower portion of the movable mast. The platform 15 of each crane 1-10 is approximately 300 lbs. heavier than the crane's movable mast 92 such that upward reaving of the movable mast occurs before the platform and downward reaving of the platform occurs before the movable mast. This ensures to the extent possible that the movable mast 92 will not be extended below the platform 15 unbeknownst to the crane operator and thus enhances the safety of the system. This also helps limit the weight which impacts on an object or the airplane 11 should a downwardly moving crane 1-10 collide with the object or airplane.

Points of reference from which distances of travel of the cranes are determined relative to the hangar coordinate system, are as follows: the north/south and inboard/outboard reference point is at the center point 21 about which each platform 15 rotates, and the up/down reference is at the middle of the horizontal thickness of each platform at point 23.

A pair of arms 100, 102 extend perpendicularly to and in the outboard direction from the movable mast 92 for supporting hoses and cables 95, such as air, water and spray paint hoses and electrical transmission cables. A control panel 103 sits on the platform 15 and is used by the crane operator/painter in operating the crane. In particular, a pushbutton pendant 105, used by the operator to control the crane, is hardwired to the control panel 103 as shown.

Generally speaking, the masts 92, 94 and platform 15 of each crane 1-10 hang from fixed bridge rails 54, 55 and a pair of movable trolley rails 56, 57. The fixed bridge rails 54, 55 are attached rigidly to the walls and ceiling of hangar 12, and the movable trolley rails 56, 57 hang from and move along the bridge rails via a plurality of bridge rollers 58 rollably retained on the lower flanges of the bridge rails by bridge end trucks 60 which also interconnect the bridge rollers to the trolley rails. A plurality of trolley cross members 62, 63 hang from the trolley rails 56, 57 and move along the trolley rails by a plurality of trolley rollers 64 which run along the lower flanges of the trolley rails and are rollably held in place on the trolley rails by trolley end trucks 66 which also interconnect the trolley rollers and the trolley cross members.

The bridge rails 54, 55 extend north and south relative to the hangar coordinate system, and the trolley rails 56 extend in east and west (inboard/outboard) directions relative to the hangar coordinate system. Thus, travel of the trolley rails 56, 57 along the bridge rails 54, 55 is in a relative northerly or southerly direction, and the travel of the trolley cross members 62, 63 is in a relative easterly or westerly (inboard or outboard), direction.

The cranes 1-10 each further comprise a pair of trolley support members 70, 72 which interconnect and extend between the trolley cross members 62, 63 to form a rectangular base structure to which the upper end of mast 94 is attached and therefore from which the masts 92, 94 and the platform 15 hang.

A plurality of motors and drive wheels for driving the gantry cranes 1-10 and their platforms 15 along the bridge rails 54, 55 and trolley rails 56, 57 in the X and Y directions, and for rotating the platforms, are provided. The actuation and speed of the motors, and hence the motion of the cranes 1-10, are controlled by a commercially available ladder logic software program (i.e., from Allen Bradley) run by the PLCs 1-10 which repeatedly examines the logical expressions on the rungs of the ladder logic within milliseconds to continually control the operation of the cranes in accordance with logical inputs, limit determining data and crane locations. The software receives inputs from the crane operator's controls, and applies logical conditions such as software limits on motion of the cranes and other fault checking conditions in determining whether to allow motion of the crane 1-10 in any particular direction. Each motor is wired to a speed board interposed between the logical outputs from the control software and the motor for interpreting the signals from the software program to operate the motor and at the proper speed.

A bridge motor 68 is mounted on a support plate (not shown) horizontally mounted to trolley rail 57 with the plate positioned underneath the motor 68. The bridge motor 68 drives bridge drive shafts 74 extending from the bridge motor, and a pair of bridge drive wheels 76, shown in dotted lines, are fixedly mounted to the ends of the bridge drive shafts and which engage the underside of the flange of the fixed bridge rails 54, 55 for driving the trolley rails 56, 57 along the bridge rails.

A trolley motor 78 is mounted on a trolley cross member 63 and trolley support 72 and is provided with a pair of trolley drive shafts 80 extending from the motor 78 toward trolley rails 56, 57 where trolley drive wheels 82 are fixed at the end of the trolley drive shaft and engage an underside of the trolley rails 56, 57 for driving the crane in an easterly, westerly, inboard or outboard direction along the hangar coordinate axis system.

A main hoist motor 84 is mounted on trolley cross member 63 and drives a main hoist drum 86. Main hoist motor 84 drives the main hoist drum 86 via a gear train housed in main hoist gear housing 89 which is mounted on trolley support 70, and main hoist shaft 88. Shaft 88 extends from gear housing 89, through the main hoist drum 86 and to an opposing support member 90 mounted on trolley support 72 and wherein the shaft 88 rotates in a journal bearing. The main hoist motor 84 raises and lowers the outer movable mast 92 along the inner mast 94 in order to raise the movable mast and the platform 15 connected thereto. The main hoist drum 86 raises the movable mast 92 by winding a pair of main hoist cables 110 around the drum 86. Each main hoist cable 110 is attached to the main hoist drum 86 at one end and extends therefrom downwardly and around a pair of pulleys 112, back upwardly to and around a second pair of pulleys (not shown) and then back downwardly to attach at end 109 of each cable 110 to the movable mast 92.

A safety hoist motor 104 is mounted to a trolley cross member 62 and drives a pair of safety hoist drums 106 via a safety hoist gear train housed within safety hoist gear box 108 and a safety hoist shaft 107. Safety hoist shaft 107 rotates on bearings in support member 111 mounted on trolley cross member 62, the shaft being driven by the safety hoist gear train and extending through the safety hoist drums 106 where the shaft is fixed to the drums. The safety hoist motor 104 operates simultaneously with the main hoist motor 84 and operates as a backup to the main hoist motor in case of its failure. A safety hoist cable 114 is attached at one end to a safety hoist drum 106 with the cable extending downwardly to and around a first lower pulley 116, upwardly to and around a central pulley (not shown>, back downwardly to and around a second lower pulley (not shown) and then back upwardly to the other safety hoist drum 106 where the other end of the cable 114 is attached at 118.

The bridge motor 68 is mounted to the support plate above the level of the other motors 78, 84 and 104, and any other structure mounted to trolley cross members 62, 63 and trolley supports 70, 72, as necessary to avoid collision between the bridge motor and the other structures during inboard and outboard travel of the cranes 1–10.

A platform motor 121 for rotating the platform 15 is mounted on a rear portion of the platform and drives an annular gear (not shown) fixed to the platform and housed within an annular gear housing 123 mounted at the base of the box-shaped support structure 98.

The present system utilizes a plurality of limit switches at various locations. These limit switches provide inputs to the control software and thus represent conditions on the operation of the above described motors and hence the motion of the cranes 1–10. Referring to FIG. 5, an outboard limit switch 122 is mounted near the outboard end of trolley rail 56 for each crane 1–10. Motion of the trolley cross members 62, 63 and trolley supports 70, 72, and hence the masts 92, 94 and platform 15, toward the outboard limit switch 122, causes trolley end truck 66 to engage the outboard limit switch. This activates the switch 122 to signal the limit of travel of the particular crane 1–10 in the outboard direction, and since the location of switch 122 is known relative to the hangar coordinate system, the switch is also used to reference the X or body buttock line position of the crane.

An inboard limit switch 124 is fixed to an opposing end of the trolley rail 56 near the furthermost inboard end of the trolley rail. Upon travel of the above-mentioned portions of the particular crane 1–10 in an inboard direction, the trolley end truck 66 engages the inboard limit switch 124 to activate the switch and thereby limit the inboard travel of the crane. The location of limit switch 124 is known relative to the hangar coordinate system, but since the switch is typically inboard of the outer surface of the airplane 11, the inboard limit switch's referencing function is utilized only to the extent an airplane is not in the hangar 12.

A bidirectional bridge limit switch 126 is mounted to one of the bridge end trucks 60. Upon relative southbound motion of the trolley rails 56, 57 along the fixed bridge rails 54, 55, the bridge limit switch 126 engages a south limit switch ramp 128 to stop the particular crane 1–10 at its southernmost limit. Similarly, bridge limit switch 126 engages a north limit switch ramp 130 to stop the particular crane 1–10 at its northernmost limit. Typically, the cranes 1–10 are referenced at their respective north limit switch ramps 130 and their outboard limit switches 122. In the reference or home position, the X and Y location of a center line of each crane 1–10, i.e., the longitudinal axis of the masts 92, 94 of the crane, are known relative to the hangar coordinate system, and from that, the X, Y locations of any other portions of the cranes, such as the corners of the platforms 15, may be determined with reference to the hangar coordinate system.

A mast full up limit switch 132 is mounted on the underside of trolley cross member 62 and engages arm 100 when the movable mast 92 is in its full up position. A proximity limit switch (not shown) is housed within gear housing 89 and is used to determine if the crane is falling too fast by counting the number of gear teeth of the main hoist system which travel by the proximity switch per unit of time, e.g., every 0.25 seconds. This avoids free falls of the cranes 1–10. A platform limit switch 134 is mounted to the box-shaped support structure 98 and is engageable by an upper platform limit switch actuator 136 protruding from and near the upper end of movable mast 92 and for limiting the upward motion of the platform 15 at its uppermost position along the movable mast 92. A lower platform limit switch actuator 138 near the lower end of the movable mast 92 engages platform limit switch 134 to limit the motion of the platform 15 at its lowermost position on the movable mast 92.

A pair of platform rotate proximity reference switches 140, 142 are mounted on the gear housing 123. The switches 140, 142 are positioned on the annular gear housing 123 such that they are approximately 45 degrees from and detect the lowermost portions of box-shaped support structure 98 on forward legs 99 and 101 thereof, respectively, for referencing the cranes 1–10. The platforms 15 also have rotation stop limit switches (not shown) which limit the rotation of the platforms as desired, e.g., which limit the rotation of the platform to 110 degrees in either the clockwise or counterclockwise directions.

It will be appreciated that other limit switches, including slow down limit switches and full down limit switches, may be placed along the various paths of travel of the cranes 1–10 and their platforms 15 to send logical inputs to the control software to slow down or stop the motion of the cranes and their platforms as desired (e.g., slow down limit switches may be located a set distance from any stopping point for the crane, whether it be a software or a hardware stop, or when the crane is moving through hazardous areas).

For determining the position of the cranes 1–10 in the X, Y, Z and rotation (R) directions, a plurality of encoders are employed. The encoders generally comprise a commercially available wheel or gear and appropriate circuitry in an encoder module for counting complete rotations and incremental parts thereof of the encoder wheels or gears and for determining the distance traveled or the number of revolutions and parts thereof rotated by the encoder wheels or gears. Similarly to the limit switches described above, the encoder modules send positional inputs to the control software as further described below.

For determining the X or inboard/outboard position of each crane 1–10, a trolley encoder 152 is positioned on each crane such that the encoder's wheel travels along trolley rail 57 as the trolley motor 78 drives the crane along the trolley rail. The wheel of the trolley encoder 152 is 25 inches in circumference and the encoder provides pulses for each 0.05 inches of motion. Outboard travel of a particular crane 1–10 increments the trolley encoder's module and inboard travel decrements the module relative to the hangar coordinate system. Each trolley encoder 152 sends the positions of its associated crane in the X direction along the body buttock lines of the airplane 11 to the crane's PLC.

For determining the Y position of each crane 1–10, a bridge encoder 154 is mounted on each crane. The bridge encoder's wheel rollably engages the underside of bridge rail 55 such that motion of the trolley rails 56, 57 along the fixed bridge rails 54, 55 causes the encoder to send pulses to the encoder module for determining the position of the crane and sending it to the crane's PLC. Like the trolley encoder 152, the bridge encoder's wheel is suitably 25 inches in circumference and is set such that the encoder pulses for each 0.05 inches of motion. North travel of the crane along the fixed bridge rails 54, 55 increments the bridge encoder's module along the Y axis which relates to the airplane's station lines, and south travel decrements the bridge encoder's module.

A hoist encoder 162 is mounted on each crane 1–10 adjacent the main hoist support 90 next to main hoist drum 86 for determining the Z axis position of the crane and its platform 15. Hoist encoder 162 is belt-driven by main hoist shaft 88, and the hoist encoder module is set according to the mechanics of the hoist (i.e., main hoist motor 84, the hoist gears in gear housing 89, shaft 88, main hoist drum 86, and cables 110 for raising the movable mast 92 and platform 15). Upward travel of a particular crane 1–10 increments the hoist encoder's module values relating to the body water line position of the crane, and downward travel decrements the module. The hoist encoder 162 sends the crane's Z positional data to the crane's PLC.

A platform encoder 156 is mounted on each platform 15. Instead of a wheel, platform encoder 156 employs a gear which meshes with the annular gear housed within gear housing 123 on the platform 15 at a 40:1 ratio. The platform encoder 156 is set such that each encoder pulse is equal to 0.08 degrees of rotational travel of the platform in a horizontal plane. The positional data from the platform encoder's module sent to a particular crane's PLC is used together with information from the bridge and trolley encoder modules to determine rotational offset positions of the platform's corners A–F (D not shown) and an impact point G in the X and Y directions.

Each crane 1–10 suitably has ultrasonic sensors 164 mounted on trolley rails 56, 57 which are directed along the Y axis in both north and south directions as necessary for determining the presence of adjacent cranes and sending a logical signal to the control program for stopping motion in the Y or station line direction of the crane before collision between cranes occurs. These ultrasonic sensors 164 prevent crane-to-crane collisions since adjacent cranes' paths of Y travel can overlap. Also, as shown in FIG. 4, each platform has a plurality of strategically placed diffused reflective infrared and/or ultrasonic sensors 166 for determining the presence of objects around and below the platform, such as an airplane wing or a vehicle on the floor, and are used to send appropriate logic control signals to the software control system.

Moreover, warning devices, such as visual or audible devices on, for example, control panel 103, are implemented as outputs from the collision avoidance system for signaling the operators of the cranes 1–10 when their particular crane is not on the software collision avoidance system discussed further below. Thus, the operators of the cranes 1–10 have confidence in knowing when the software collision avoidance system is activated and can be alerted when it is not.

Each day before operating the cranes 1–10, the operators/painters reference their cranes and initiate the software collision avoidance system. The referencing procedure for each crane 1–10 involves the following steps: 1) Positioning the crane ten feet from either the north or south limit switch ramp 130 or 128 and ten feet from the outboard limit switch 122. 2) Rotating the platform 15 to the zero position wherein the front edge of the platform is parallel to the Y axis of the hangar coordinate system. 3) Turning on a referencing key switch and pressing the auto function on pendant 105 at the same time as the clockwise or counterclockwise function. 4) Driving the crane north or south at full speed until the limit switch ramp 130 or 128 and limit switch 126 causes the crane to stop. 5) Waiting for five seconds. 6) Driving the crane outboard at full speed until the outboard limit switch 122 causes the crane to stop. 7) Waiting five seconds. 8) On crane nos. 2, 4, 6, 8 and 10, rotating the platform 15 counterclockwise 45 degrees and stopping.

On crane nos. 1, 3, 5, 7 and 9, rotating the platform 15 clockwise 45 degrees and stopping. 9) Waiting five seconds. 10) Driving the crane off the limit switch ramp 130 or 128. The hoist references automatically each time it passes from its upper quadrant to its lower quadrant and vice versa.

Feedback from the above described encoder modules as to the X, Y, and Z locations, including rotational offsets in X and Y, of certain corners A–F and an impact point G of each platform 15 is used to determine which set of data within each PLC is to be used in setting software limits on each crane 1–10. Since each crane 1–10 is limited in its access to a certain portion of the airplane 11, only that data, as received from computer 2D and processor 24, necessary to determine the software limits on a particular crane about the limited portion of the airplane accessible by that crane, need be contained within that crane's PLC.

The determination of which data received by the PLC is to be used at any given time by that PLC to determine software limits on the crane's motion depends on the particular motion of the crane at that time. Accordingly, the Z and Y locations of, for example, corners A and B and impact point G of each platform 15 are compared with the positions of certain station (Y axis) and body water (Z axis) lines of the airplane 11, as offset and determined according to the above described positioning process.

Figure 8:
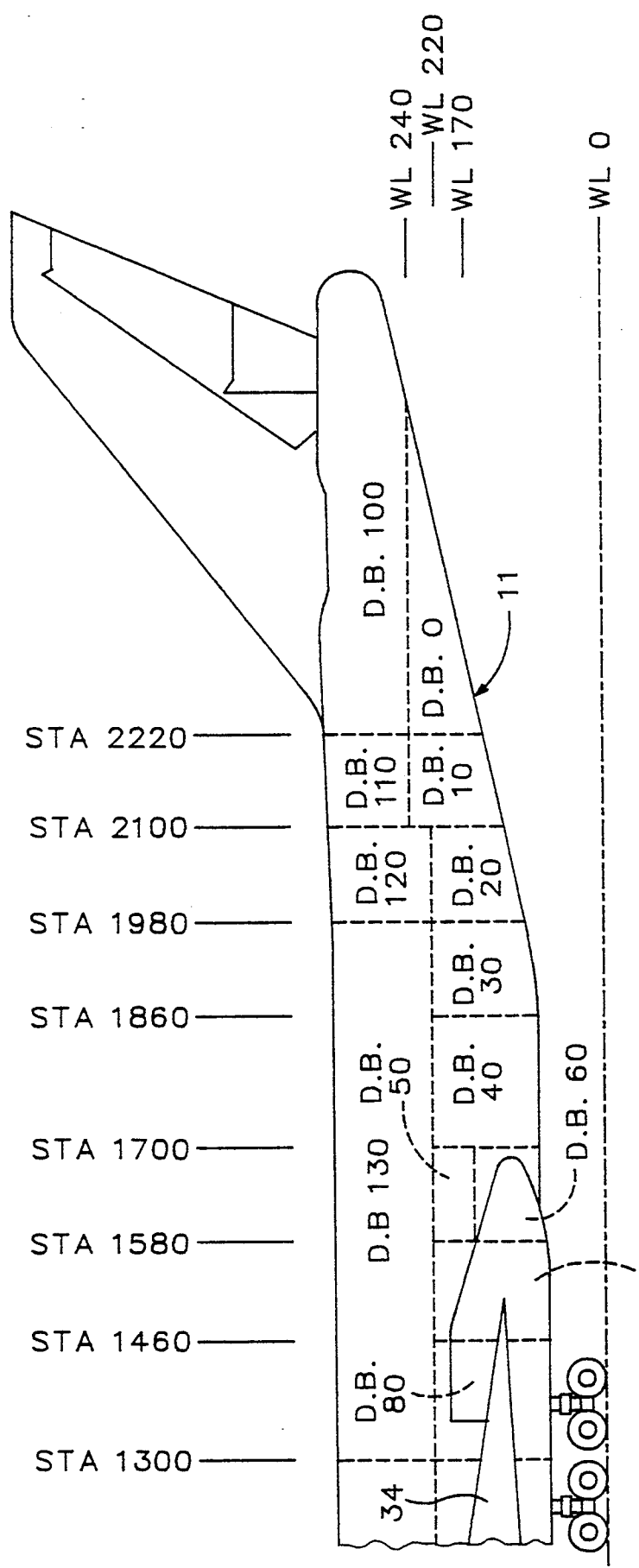
FIG. 8 is a partial side view of an airplane illustrating an example of how the airplane may be divided and represented by data blocks.

These Y and Z axis lines with which the platform corners A and B and impact point G are compared are those Y and Z axis lines delineating data blocks contained within the PLCs shown in FIG. 8; these lines are labeled in the Z axis as water line (WL) 170, 220 and 240, and in the Y axis, station line (STA) 1300, 1460, 1580, 1700, 1860, 1980, 2100 and 2200. The airplane 11 may be divided and represented by such data blocks to simplify the calculation of the software limits by minimizing the amount of data necessary to calculate these limits. Thus, for example, instead of having to determine a software limit as an offset from each and every point along the surface of the airplane 11 and for each and every point along the edge of the platform 15, software limits are determined for each crane according to a relatively small set of data as determined by the Y, Z location of the crane and the limits on the crane's access to the airplane. The differing sizes of the data blocks accounts for the fact that the surface of the airplane does not change significantly enough along certain portions thereof to justify determining new software limit determining data along that surface of the airplane. Thus, where the data blocks correspond to a larger airplane surface area, e.g., data block 130, where the airplane is nearly a constant cylindrical section, the larger surface area can be represented adequately by basically the same amount of data as is the case where the data block represents a smaller more complex surface area of the airplane, e.g., data block 60. This method of determining limits on the cranes' motion allows the processing system to function more efficiently and rapidly, since only relatively small "chunks" of data are utilized at any given time by the PLCs.

Thus, for example, crane 8's PLC would contain data from those data blocks between its south and north limits as determined by its limit switch actuator locations, e.g. 1466.9 and 2239.8, respectively. This would include data blocks 0–70 and 100–130 as shown in FIG. 8.

The actual positions of the corners A–F and impact point G of the platforms 15 may be determined as X, Y rotational offsets from the X, Y positions of the rotational centers of the platforms determined from the modules for the trolley and bridge encoders 152, 154. The X, Y rotation offsets of the corners A–F and impact point G of the platforms 15 are determined according to trigonometric relationships. Thus, the X rotational offset of a corner A–F or impact point G may be determined according to the equation $X = \cos|\alpha| \times R$, where $\alpha$ is the angle of rotation of the platform and R is the constant distance between the center of rotation of the platform and the corner or impact point. For corners A and B and impact point G of the platforms, this X offset value is subtracted from the X, Y position of the platform's rotational center to determine the rotationally offset X position of the corners and impact point. The Y rotational offset of a corner A–F or impact point G is determined according to the equation $Y = \sin|\alpha| \times R$, where $\alpha$ is the angle of rotation of the platform and R is the constant distance between the center of rotation of the platform and the corner or impact point. A negative rotation indicator determines whether this distance value is added to or subtracted from the Y value of the platform's rotational center for determining the rotationally offset Y value of the corners A and B or impact point G. The corners A and B and impact point G of the platform 15 are of primary concern since they are those typically facing the airplane 11.

The negative rotation indicator also determines whether corner A or B is leading, or whether neither corner is leading (i.e., the front edge of the platform 15 is parallel to the Y axis), as the platform is moved inboard toward the airplane 11. If the platform 15 is rotated sufficiently past zero rotation, then the non-leading corner of the platform need not be considered in setting software limits and the position of that corner need not be compared with the software limits.

The rotationally offset Y locations and the Z locations of the corners A and B and impact point G of each platform 15 are used in determining which data block or blocks will be used in setting software limits on the particular crane's motion, and the X, Y and Z locations of these corners and impact point are also compared to the software limits in determining whether to allow further motion of the crane in a particular direction. Thus, it will be appreciated that since the corners A and B and impact point G of platform 15 might be positioned adjacent one or more data blocks at any one time, comparison of the rotationally offset locations of the different corners A and B and impact point G may need to be performed against one or more software stop and one or more software slow down limits at any given time.

Figure 9:
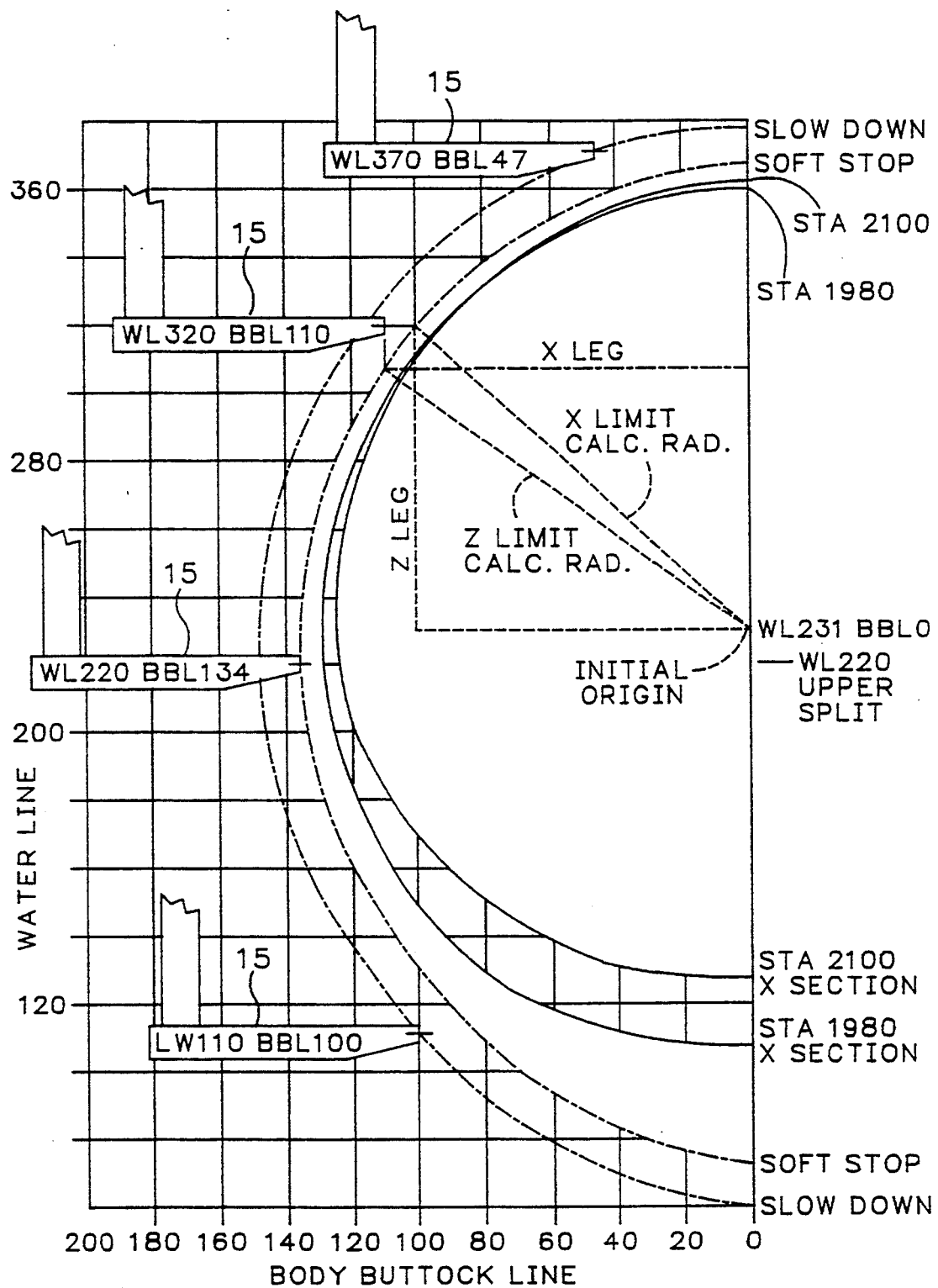
FIG. 9 illustrates partial airplane fuselage cross sections, software stop and slow down limits, and a plurality of schematic platforms positioned around the fuselage cross sections.

Referring now to FIG. 9, the software stop and slow down limits (represented as dash dotted lines in FIG. 9) on a particular crane may be determined according to information in each data block and by solving for R in the Pythagorean theorem equation $R^2 = X^2 + Z^2$. Thus, for example, the data contained in a particular data block, e.g. data block 120 which is delineated by offset water line 220 and offset station lines 1980 and 2100, includes: An anchor line (station line 1980 for data block 120), a known initial origin Z location (water line 231 and buttock line 0 for data block 120), a known origin taper multiplier to determine the Z taper of the origin along the Y length of the data block (0.0333 in. of Z taper for every inch of Y travel for data block 120), an initial radius between the origin and the soft stop and slow down limits (i.e., the radius of the fuselage plus the desired distance to be stopped or slowed down from the airplane—133.75 for data block 120), an ellipse origin used in determining the fade of the software limits on the platforms 15 in the X and Z directions to allow for the height of a painter on the platform as the platform begins to move underneath the airplane (water line 320 for data block 120), and ellipse X and Z gain values to determine the extent of fade of the software limits as the platform moves under the airplane (0.03 and 0.03., respectively, for data block 120). Where the software limits are circular, the X and Z gain values are equal according to standard circle geometry, as is the case with data block 120. As the location of the relevant corners of platform 15 move in Y and Z directions along a particular data block, the limits for the relevant platform corners are recalculated at desired Y and Z distance intervals depending on the desired resolution of calculation (e.g., every 20 or 40 inches for less complex surfaces). Depending on the direction of movement of the particular crane, for example in the Y direction, and depending on whether the taper of the airplane surface or origin is increasing or decreasing along that direction of motion of the crane, the origin and radius taper multiplier values are used to increase or decrease the origin's Z location and the radius for determining the software limits. Thus, the calculated software limits always depend on the location of the relevant platform corners.

In the above mentioned Pythagorean equation, $R^2=X^2+Z^2$, R is the radius adjusted as described above between the origin adjusted by the origin taper multiplier as described above and the software slow down or stop limit at a given Y, Z platform location. The location of the particular or relevant origin of the airplane, as indicated above, is determined according to the rotationally offset Y position and the Z position of the relevant platform (usually corners A and B and impact point G) as determined from the particular crane's bridge and hoist encoder modules.

In the above mentioned equation, X is the leg for determining the upward/downward (Z) limit of platform 15 and is the X distance between the X position of the relevant platform corners and the offset X value of the particular origin of the airplane determined as described above and according to the Y, Z locations of the relevant corners on the platform.

Furthermore, in the above mentioned equation, Z is the leg for determining the inboard/outboard (X) software limit on the travel of the platform 15 and is the Z distance between the Z position of the relevant platform corners and the offset Z value of the origin of the airplane determined as described above and according to the Y, Z locations of the relevant corners on the platform.

It can be seen from looking at FIG. 2 that the fuselage of the airplane 11 is tapered along its longitudinal axis 14, and the wings 34 are also tapered. Accordingly, it will be appreciated that there is a potential for collision when the platform 15 of a particular crane attempts to rotate or travel in a Y direction into an increasing taper (i.e., where the body buttock value of the airplane is increasing) if the relevant platform corner is within an X direction soft stop zone or slow down zone. Therefore, an arbitrary taper sign is assigned with the front portion of the airplane 11 having a positive taper and the rear portion of the airplane having a negative taper. Any time a relevant platform corner is within a soft stop or slow down zone, the sign value of the proposed Y motion of that corner, whether it be a rotational or non-rotational motion, is compared to the sign of the taper, and such attempted motion is limited or not limited accordingly. Thus, for example, incrementing Y travel of the relevant corner of a platform 15 in a positive taper region of the airplane 11 will not be permitted when that corner is within a soft stop zone. Similarly, such incrementing Y travel will be slower when that corner is in a soft slow down zone. Assuming no other limits on the motion of the particular platform 15, Y travel in the opposite direction would be permitted.

It will be further appreciated that, since the airplane is symmetrical about its longitudinal axis, the above-described principles will apply to determining software limits on both sides of the airplane.

To a certain extent, stacker cranes 3, 4, 5 and 6 may access the wings 34 of the airplane 11. Accordingly, it will be appreciated from the foregoing that the determination of software limits on the cranes' motion about the wings of the airplane 11 may be accomplished by rotating 90 degrees in the horizontal X, Y plane. That is, for example, such software limits may be determined by solving for R in the equation $R^2=Y^2+Z^2$, where R is a radius determined according to an initial radius and radius taper value according to the X, Z positions of the relevant corners of the platform, which radius R extends from an offset wing origin point determined according to an initial wing origin at the anchor line of the particular data block and adjusted for origin taper according to the X, Z positions of the corners of the platform.

For this wing equation, Y is the leg for determining the upward/downward (Z) limit of travel of the platform 15 and is the distance between the Y position of the platform and the offset Y value of the origin of the wing determined from an origin taper multiplier and an initial offset origin at the anchor line of the data block and according to the particular rotationally offset X location and the Z location of the relevant platform corners and/or impact point relative to the hangar coordinate system.

Z, in the above mentioned Pythagorean wing equation, is the leg for determining the inward/outward travel limit on the platform relative to the wing (i.e., travel in the Y axis direction). This leg is the distance between the Z position of the platform and the offset Z value of the origin of the wing determined from an origin taper multiplier and an initial offset origin at the anchor line of the data block and according to the particular rotationally offset X location and the Z location of the relevant platform corners and/or impact point relative to the hangar coordinate system.

Similar to the software limits shown in FIG. 9 where the platform 15 moves underneath the airplane 11, the software limits underneath a wing 34 account for the height of a painter working underneath the wing. Likewise, similar considerations are taken in determining whether to allow the platform 15 to rotate relative to the wings 34 of the airplane 11 and keeping in mind the need to rotate 90 degrees as mentioned above. Though the cranes of the present system are shown in FIG. 2 as not accessing the entire wing 34 of the airplane 11, it will be appreciated that, given such access capability, control can be accomplished in accordance with the above described principles.

It will be appreciated from the foregoing discussion that certain economies in calculation may be accomplished according to the known position of a platform 15. Thus, for example, when a platform 15 is above a certain water line where the surface of the airplane is no longer increasing or decreasing in size along the X axis, it is known that the crane is free to move in an upward Z direction, at least with respect to that portion of the airplane and to the extent there is no airplane structure, such as a stabilizer, provided for in determining the software limits on the upward motion of the crane at that particular crane location. Thus, other software or limit switch limits on the upward motion of the crane may be imposed as necessary to avoid duct work or railings or other objects above the crane at the crane's particular X, Y and Z location. Of course, to the extent such limitations are in the software, they would be represented as constant software limitations on the crane's movement rather than parametric offset limitations depending on the particular position of the airplane. Similarly, when a platform 15 is below such a water line, it is known that the crane is free to move in a downward Z direction until it reaches a full down limit and assuming there are no other known objects along the projected path of the crane. Moreover, it will be also be appreciated that for some of the stacker cranes, including cranes 1, 2, 7 and 8, there may be no need to compare the stacker's Y positions with the wings 34 of the airplane 11, since the north and south limit switch ramps 130, 128 for those cranes may be positioned so as not to allow those cranes to travel over the wing areas of the airplane.

As for the stacker cranes 3 and 4, additional software mapping considerations include the need to avoid the cantilevered rails 32 which extend from the side of the hangar inwardly toward the fuselage of the airplane and which are positioned above the leading edges of the wings 34. Thus, within the software limits of motion of stacker cranes 3 and 4, there are constant limitations representing these rails 32. Accordingly, to move around rails 32, stacker cranes 3 and 4 must either be raised to a position where the platforms 15 of the stackers can pass over the rails or must travel inboard a sufficient distance to go around the rails.

Similarly, there are designated locations on the floor of the hangar 12 where such things as trash bins (not shown) may be positioned, and such obstacles would also be mapped into the software limitations on the motion of the affected stacker cranes 1-10.

As indicated above, other conditions which are represented in the ladder logic software and which, if satisfied, would preclude operation of the affected crane, include such things as motor inverter faults, slack cable conditions, platform imbalances, overspeed conditions (i.e., free falling platforms 15), broken cable conditions, and platform overload conditions.

The system is usable to fully automate the preparing, painting and maintaining of aircraft. With this system, computers determine software limits and designate and control the paths of travel for the stacker cranes, their platforms and suitably a plurality of numeric controlled robotic end effecters mounted on the platforms and which may spray and dispense the water, strippers, paint and other chemicals necessary for preparing and painting the aircraft. Other advantages of the system, known as a profiling system, include improved employee health and safety, and reduced production time.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. Apparatus for locating an aircraft relative to a known reference and for preventing collisions between the aircraft and a movable work platform, said apparatus comprising:

scanning means for ascertaining a portion of the aircraft and generating and storing a set of data representative of the portion of the aircraft;

means for determining the spatial position of the aircraft relative to the known reference according to the set of data from said scanning means and a known relationship between the portion of the aircraft scanned and another portion of the aircraft;

means for determining the spatial and rotational position of the movable work platform relative to the known reference; and means for setting three-dimensional and rotational movement restriction limits on the movable work platform when movement beyond such limits will result in a collision between the movable work platform and the aircraft, said setting means employing the stored set of data from said scanning means.

2. The apparatus of claim 1 wherein said means for determining the spatial position of the aircraft comprises a hangar processor.

3. The apparatus of claim 1 wherein said work platform is manually operated.

4. The apparatus of claim 1 wherein said movement and rotational limits are alterable to accommodate different aircraft.

5. Apparatus according to claim 1 wherein said means for setting movement restriction limits is adapted to reduce a maximum speed of movement of the work platform in at least one direction when said platform is between first and second distances from the airplane.

6. Apparatus according to claim 1 wherein said means for setting movement restriction limits is adapted halt movement of the work platform in at least one direction when said platform is less than or equal to a first distance from the airplane.

7. Apparatus for locating an aircraft relative to a known reference, said apparatus comprising:

scanning means for ascertaining a portion of the aircraft, wherein said scanning means comprises a plurality of movable scanners which ascertain edges of wings of the aircraft, wherein said plurality of movable scanners comprise a plurality of infrared photo-optic sensors each mounted on an end of an extendible and retractable cylinder piston which is mounted on a support structure suspended above the edges of the wings, said scanning means also comprising a plurality of light reflecting scanner targets positioned beneath the wings and said infrared photo-optic sensors for reflecting light back to said sensors; and means for determining the position of the aircraft relative to the known reference according to data from said scanning means and a known relationship between the portion of the aircraft scanned and another portion of the aircraft, wherein said determining means ascertains the position of a point relative to the known reference and having a known relationship with the other portion of the aircraft and wherein the point is a point of intersection of lines through collinear points along the wings, and wherein said determining means uses the position of the point and the point's known relationship with the other portion of the aircraft for determining the location of the aircraft.

8. The apparatus of claim 7 wherein said infrared photo-optic sensors' positions are known relative to the known reference such that upon ascertaining the edge of the wings, said sensors' positions are sent to said determining means for ascertaining a point of intersection of wing edge lines.

9. A collision avoidance system for limiting the motion of a plurality of apparatus movable around an aircraft, said system comprising:
means for ascertaining a portion of the aircraft;
identifying means for determining the general outline and position of the aircraft relative to a known reference according to data from said means for ascertaining the portion of the aircraft and a known relationship between the portion of the aircraft and other portions of the aircraft;
means for determining the respective positions of ones of said plural apparatus; and
means responsive to said identifying means and said determining means for setting limits on motion of the plural apparatus within predetermined range of said aircraft as determined from the general outline and position of the aircraft and for preventing movement by said plural apparatus beyond the limits to avoid collision between ones of the apparatus and the aircraft.

10. A collision avoidance system in accordance with claim 9 wherein said limits are changeable to accommodate differently positioned aircraft.

11. A collision avoidance system in accordance with claim 9 wherein said plurality of apparatus comprise plural cranes movable around the aircraft and wherein said identifying means determines the position of a point relative to the known reference and having a known relationship with the other portions of the aircraft, said identifying means using the position of the point and the point's known relationship with the other portions of the aircraft for determining the general outline and position of the aircraft.

12. Apparatus according to claim 9 wherein said plurality of apparatus include means for detecting proximity between ones of said apparatus and other ones of said apparatus, and wherein said limit setting means further sets limits on motion of the plural apparatus within predetermined range of one another to avoid collision between ones of said apparatus and other ones of said apparatus.

13. A collision avoidance system for limiting the motion of a crane movable by an operator around an aircraft, said system comprising:
means for ascertaining a portion of the aircraft;
identifying means for determining the general outline and position of the aircraft relative to a known reference according to data from said means for ascertaining the portion of the aircraft and a known relationship between the portion of the aircraft and other portions of the aircraft, wherein said identifying means determines the position of a point relative to the known reference and having a known relationship with the other portions of the aircraft, said identifying means using the position of the point and the point's known relationship with the other portions of the aircraft for determining the general outline and position of the aircraft; and
means responsive to said identifying means for setting limits on motion of the crane within predetermined range of said aircraft as determined from the general outline and position of the aircraft to avoid collision between the crane and the aircraft, wherein said crane is coupled to means for determining positions of said crane relative to the known reference and sending said crane's positions to said means for setting limits, and wherein said means for setting limits compares the positions of said crane with said set limits to determine whether to signal further motion of said crane.

14. A collision avoidance system in accordance with claim 13 wherein said crane is a gantry crane comprising a vertically extendible and retractable mast which moves along rails mounted in a hangar, said crane also comprising a platform connected to said mast and from which said crane's operator operates said crane, said mast and hence said platform being movable along X, Y and Z directions, said platform also being rotatable about said mast.

15. A collision avoidance system in accordance with claim 14, further comprising a plurality of motion limiting sensors selected from the group consisting of limit switches, wands, contact tapes, bumpers, ultra-sonic and reflective light sensors, said sensors being placed at a plurality of locations on said crane and said platform additionally to prevent collision between said crane and platform and other objects in said hangar including said aircraft.

16. A method of determining the position of an aircraft relative to a known reference and preventing collisions between the aircraft and a movable work platform, comprising the steps of:
scanning to ascertain a portion of the aircraft;
determining the position of the aircraft from data from the scanning step and a known positional relationship between the portion scanned and another portion of the aircraft;
generating a set of limits defining boundaries around the perimeter of the aircraft; and
limiting movement around the aircraft of a movable work platform based on the generated set of limits for preventing collision between the work platform and the airplane upon three dimensional and rotational movement of the platform.

17. A method in accordance with claim 16 wherein the determining step involves determining the position of a point according to data from said scanning step, the point having a known relationship with another portion of the aircraft, and wherein the known relationship is used in determining the position of the aircraft.

18. A method in accordance with claim 17 wherein the scanning step comprises the step of scanning the leading edges of wings on the aircraft with a plurality of scanners, and wherein the point determined is a point of intersection of lines through a plurality of collinear points along the edges of the wings scanned.

19. A hangar in which the position of an aircraft is to be determined relative to a known reference in said hangar, said hangar comprising:
a building of sufficient size for at least one aircraft;
scanning means mounted within said building for ascertaining a portion of the aircraft relative to the known reference, and processor means for receiving data from said scanning means for determining the location of the aircraft from the data and a known relationship between the portion scanned and another portion of the aircraft;

said processor means setting spatial boundary limits around the aircraft based on the determined location of the aircraft for preventing movement of a work apparatus beyond the set boundary limits.

20. A hangar having a collision avoidance system therein and comprising:

a building of sufficient size to house at least one aircraft and a plurality of gantry cranes within the building;

scanning means mounted within said building for ascertaining a portion of the aircraft;

computing means for receiving data from said scanning means for determining the location of the aircraft from the data and a known relationship between the portion scanned and another portion of the aircraft and for setting limits on the motion of said gantry cranes according to the determined position of the aircraft; and means for sending said gantry cranes' locations to said computing means to enable said computing means to compare the locations of said gantry cranes with said set limits to determine whether to allow further motion of said gantry cranes in avoiding collision with the aircraft.

* * * * *